United States Patent [19]

Nagano

[11] Patent Number: 5,326,157
[45] Date of Patent: Jul. 5, 1994

[54] WHEEL MOUNTING APPARATUS FOR A BICYCLE

[75] Inventor: Masashi Nagano, Izumi, Japan

[73] Assignee: Shimano Inc., Osaka, Japan

[21] Appl. No.: 905,402

[22] Filed: Jun. 29, 1992

[30] Foreign Application Priority Data

Jul. 1, 1991 [JP] Japan .................. 3-160254

[51] Int. Cl.5 .............................................. B60B 27/06
[52] U.S. Cl. .................... 301/110.5; 301/111; 411/8; 403/27
[58] Field of Search ............... 301/105.1, 110.5, 111, 301/114, 124.1; 411/8, 9, 10; 403/27; 116/67 R

[56] References Cited

U.S. PATENT DOCUMENTS

| | | | |
|---|---|---|---|
| 4,079,958 | 3/1978 | Segawa | 280/279 |
| 4,400,038 | 8/1983 | Hosokawa | 301/124.2 |
| 4,770,011 | 9/1988 | Constant | 301/124.2 X |
| 5,165,762 | 11/1992 | Phillips | 301/111 X |

FOREIGN PATENT DOCUMENTS 2597058 10/1987 France .
2637248 4/1990 France .

*Primary Examiner*—Russell D. Stormer
*Attorney, Agent, or Firm*—Dickstein, Shapiro & Morin

[57] ABSTRACT

A wheel mounting apparatus for attaching a wheel to the wheel forks of the body frame of a bicycle, comprising an axle for rotatably supporting the wheel and engageable with the wheel forks of the body frame, a retaining device for preventing detachment of the axle from the wheel forks, the retaining device being constantly biased to an operative position to prevent detachment of the axle from the wheel forks, or an inoperative position to allow detachment of the axle from the wheel forks, and a control device for switching the retaining device from the inoperative position to the operative position. The control device is operable with rotation of the wheel relative to the wheel forks to switch the retaining device automatically from the inoperative position to the operative position.

5 Claims, 5 Drawing Sheets

WHEEL MOUNTING APPARATUS FOR A BICYCLE

BACKGROUND OF THE INVENTION

1. Field of the Invention

The present invention relates to a wheel mounting apparatus for a bicycle for facilitating attachment and detachment of a wheel and reliably securing the wheel to the wheel forks of the bicycle frame.

2. Description of the Related Art

With a conventional wheel mounting apparatus as noted above, a wheel is tightened to the wheel forks of the body frame of a bicycle by a quick release attached to a hollow axle, with detachment of the wheel from the wheel forks of the body frame reliably prevented by operating locking elements also attached to the hollow axle. However, the wheel may be assembled to engaging portions of the wheels forks of the body frame only when the locking elements are manually set to an inoperative position. Further, it is necessary to switch the locking elements to an operative position manually.

SUMMARY OF THE INVENTION

An object of the present invention is to provide a wheel mounting apparatus for securing a wheel to the wheel forks of the body frame of a bicycle in an undetachable state without manually maintaining locking elements in a particular position during or after an operation to assemble the wheel to the body frames.

The above object is fulfilled, according to the present invention, by a wheel mounting apparatus for a bicycle comprising locking elements biased to an operative position for preventing detachment of a wheel from the wheel forks of the body frame or to an inoperative position for allowing attachment and detachment of the wheel to/from the wheel forks of the body frame. With rotation of the wheel relative to the wheel forks of the body frame, the locking elements are automatically switchable from the inoperative position to the operative position.

With the above wheel mounting apparatus for a bicycle, the wheel may be attached without the trouble of manually maintaining the locking elements in the inoperative position not to obstruct the attaching operation, since the locking elements have a self-holding function to remain in the inoperative position. After the wheel is attached to the wheel forks of the body frame, the user may just push or ride the bicycle without manually switching the locking elements to the operative position. The resulting rotation of the wheel automatically causes a control device to switch each locking element 9 to the operative position.

Other objects and features of this invention will be understood from the following description taken with reference to the accompanying drawings.

DETAILED DESCRIPTION OF THE PREFERRED EMBODIMENT

Figure 5:
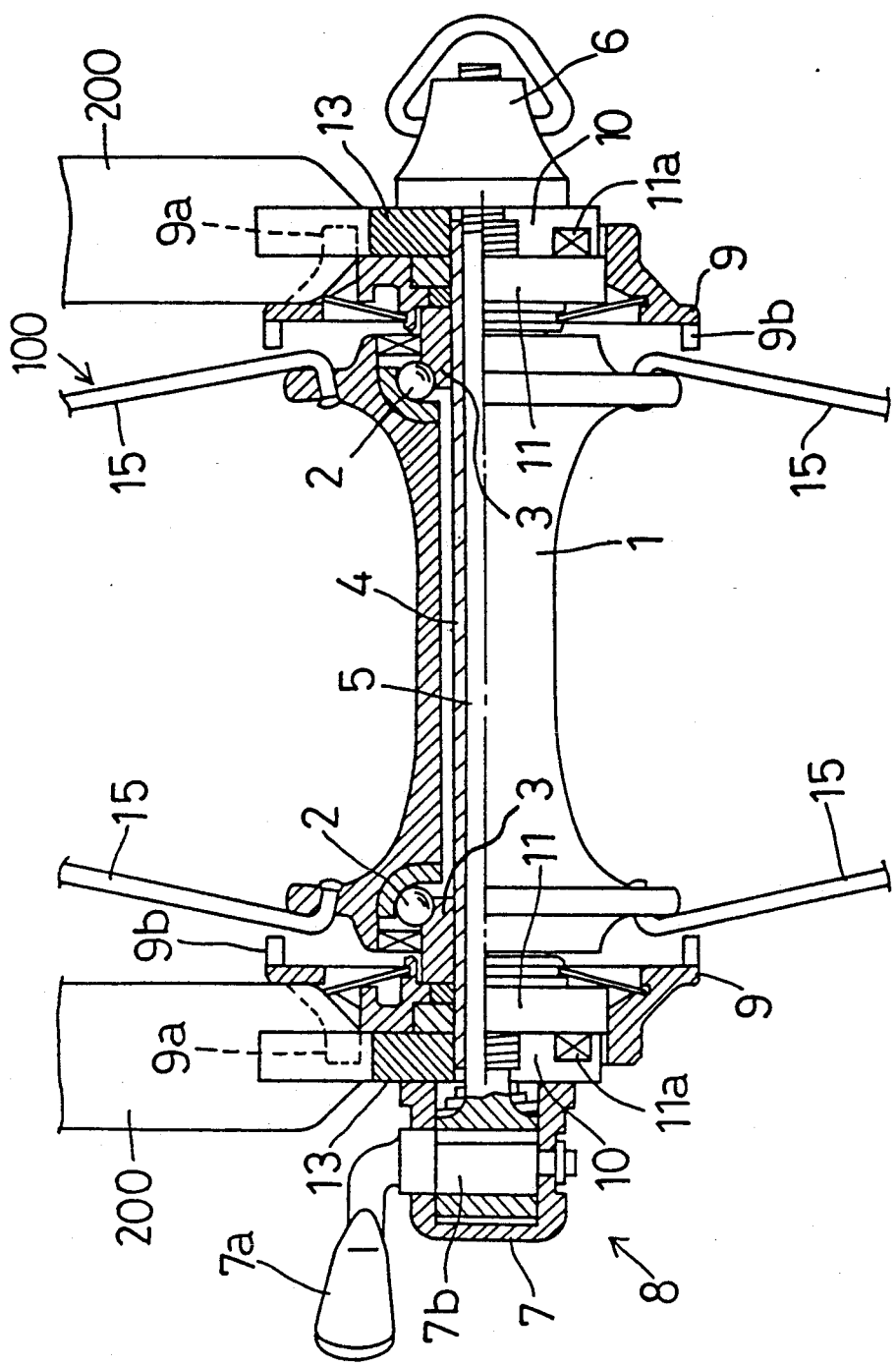
FIG. 5 is a sectional view of an entire hub with a wheel mounting apparatus according to the present invention mounting in place.

FIG. 5 shows a wheel mounting apparatus for a bicycle. As seen, a hub 1 is supported on a hollow axle 4 through balls 2 and ball retainers 3. A quick release apparatus 8 includes a drawbar 5 extending axially through the hollow axle 4, and a backing element 6 and a clamp 7 disposed at opposite ends of the drawbar 5. The quick release apparatus 8 is operable to fasten the hub 1 and a pair of wheel forks of a bicycle frame 200 together for securing a wheel 100 to the wheel forks 200. A pair of locking elements 9 are disposed at opposite ends of the hub 1 to prevent the wheel 100 from becoming detached from the wheel forks of the body frame 200. This wheel mounting apparatus is devised to facilitate attachment and detachment of the wheel 100, and reliably to prevent the wheel 100 from falling off the wheel forks of the body frame 200, as follows.

Figure 3:
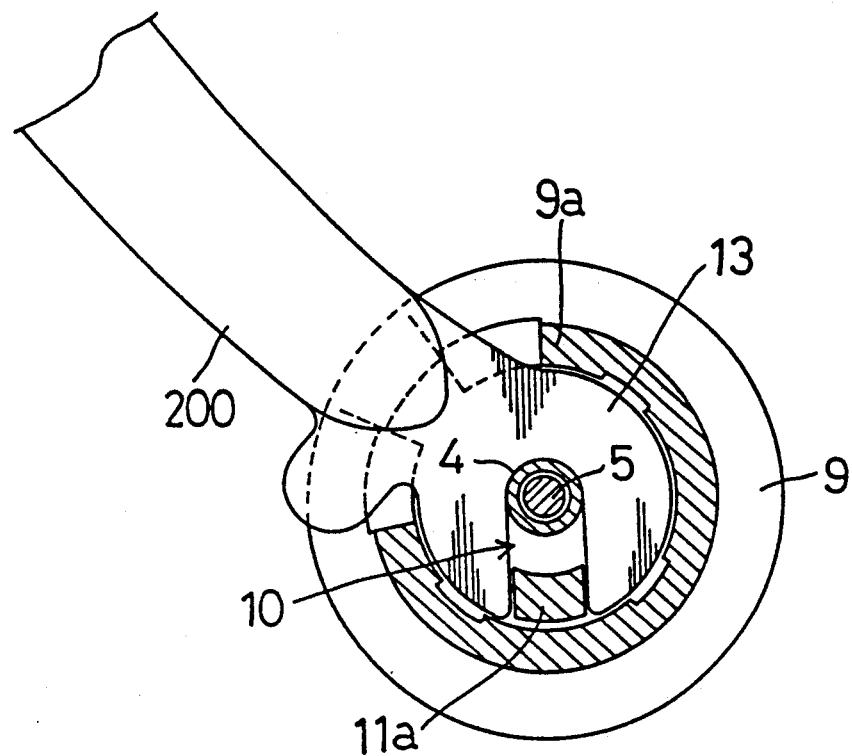
FIG. 3 is a side view of the wheel retaining device in the operative position.

The wheel 100 is assembled to the wheel forks of the body frame 200 with one end of the hollow axle 4 fitted in a wheel attaching cutout 10 defined in one of the wheel forks 200, and the other end of the hollow axle 4 fitted in a wheel attaching cutout 10 defined in the other wheel fork 200. As shown in FIG. 3, each of the wheel attaching cutouts 10 opens downward, and the hollow axle 4 is vertically moved into and out of engagement with the wheel forks of the body frame 200. The clamp 7 of the quick release apparatus 8 has a rocking lever 7a operable to place a tightening cam 7b in an inoperative position, whereby the clamp 7 and backing element 6 are moved away from each other, and both the right and left locking elements 9 are switched to an inoperative position. In this state, the wheel 100 may be mounted in place by moving the wheel 100 upward into a wheel engaging portion of the wheel forks 200 and fitting the opposite ends of the hollow axle 4 into the wheel attaching cutouts 10. The wheel 100 is removable by pulling the wheel 100 downward away from the body frames 200.

Figure 1:
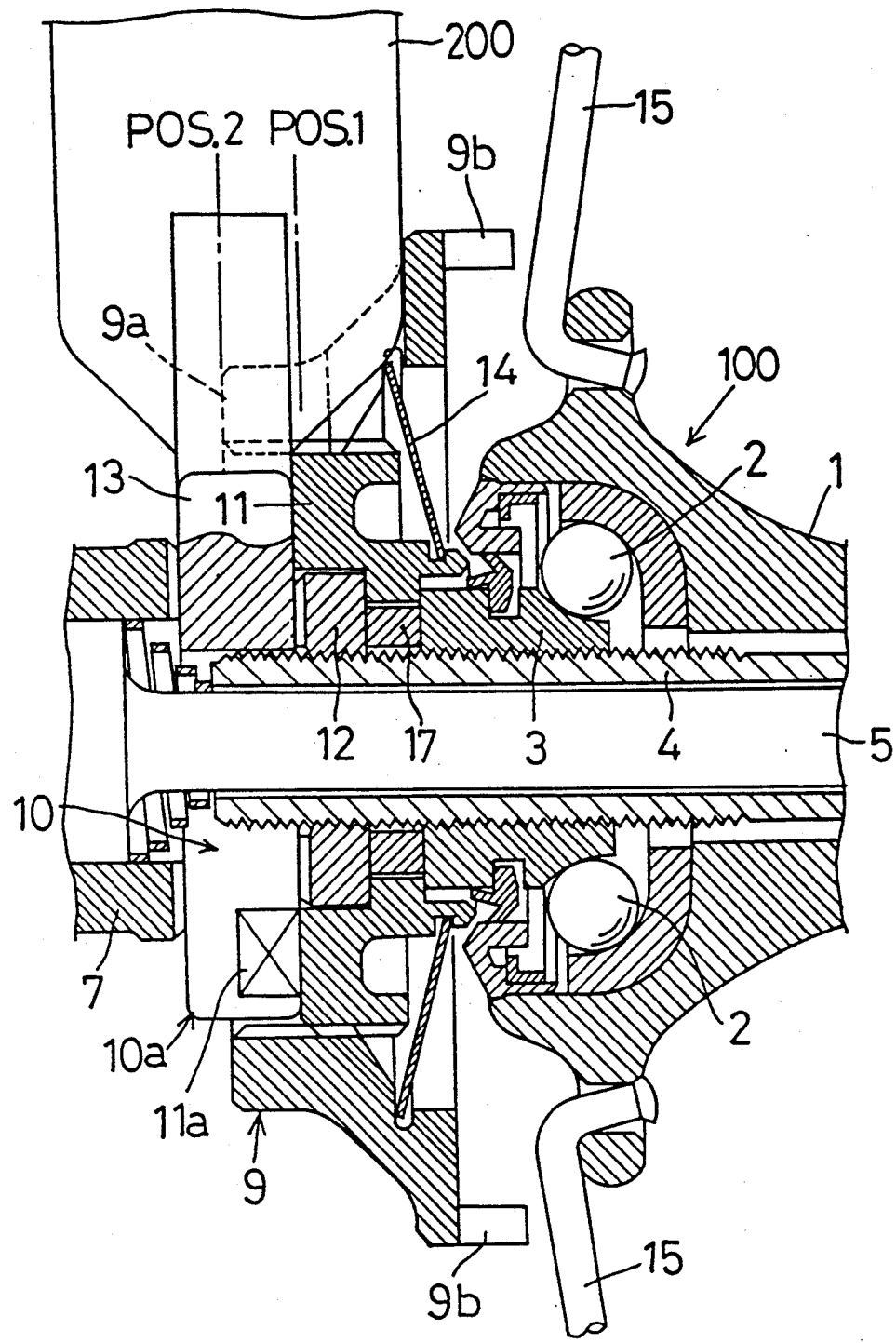
FIG. 1 is a sectional view of a wheel retaining device in an operative position according to the present invention.
Figure 2:
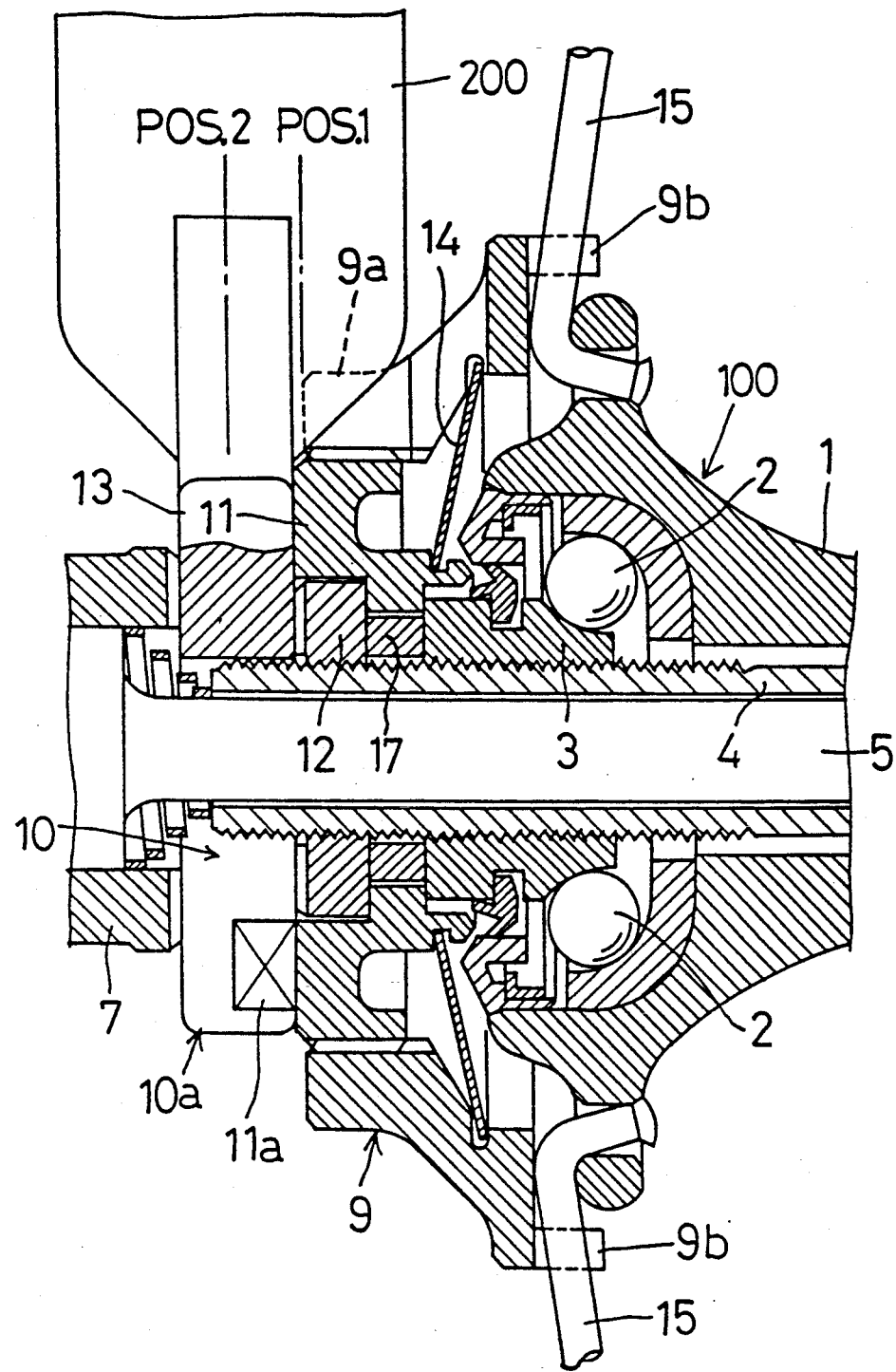
FIG. 2 is a sectional view of the wheel retaining device in an inoperative position.
Figure 4:
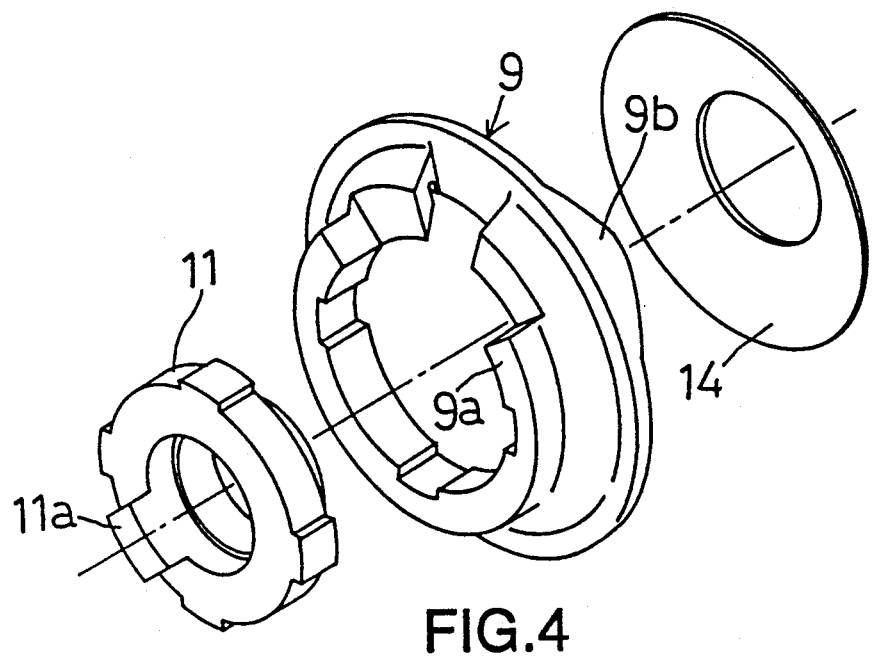
FIG. 4 is a perspective view of the wheel retaining device.

As shown in FIG. 1, each locking element 9 is mounted on the hollow axle 4 through a support element 11, a spacer ring 17 and a ball pressing lock nut 12. The locking element 9 is splined to the support element 11 only to be slidable axially of the hollow axle 4. Through this sliding movement, the locking element 9 is switchable between an operative position POS. 2 and an inoperative position POS. 1. In the operative position POS. 2, as shown in FIGS. 1 and 3, the locking element 9 has a working end 9a thereof as shown in FIG. 4 surrounding and contacting a wheel attaching portion 13 of the body frame 200. The contact between the working end 9a and the wheel attaching portion 13 prevents disengagement of the hollow axle 4 from the body frame 200. In the inoperative position POS. 1, as shown in FIG. 2, the working end 9a lies away from the wheel attaching portion 13 and closer to the hub 1 to allow disengagement of the wheel 100 from the body frame 200. The support element 11 has a rotation stopper projection 11a extending into the wheel attaching cutout 10 to engage the body frame 200, whereby the support element 11 is prohibited from rotating relative to the body frame 200. Even in the inoperative position POS. 1, the locking element 9 does not rotate relative to the body frame 200 since the locking element 9 is splined to the support element 11 against rotation. Thus, the locking element 9 is constantly maintained ready to slide and engage the working end 9a with the wheel fork 200.

The locking element 9 acts on an outer periphery of a disc spring 14 having an inner periphery supported by the support element 11. The sliding movement of the locking element 9 switches the disc spring 14 between a first biasing position and a second biasing position. In the first biasing position, the disc spring 14 pushes the locking element 9 to the inoperative position POS. 1. In the second biasing position, the disc spring 14 pushes the locking element 9 to the operative position POS. 2.

The locking element 9 includes a plurality of cam portions 9b as shown in FIG. 4, formed on a side thereof opposed to the hub 1. The cam portions 9b have a function to mechanically switch the locking element 9 from the inoperative position POS. 1 to the operative position POS. 2 with rotation of the wheel 100. More particularly, when the locking element 9 is in the inoperative position POS. 1, the cam portions 9b lie inwardly of a revolving plane of spokes 15 of the wheel 100. Thus, the cam portions 9b in this state contact the spokes 15 when the wheel 100 is rotated. When the spokes 15 push the cam portions 9b in a direction of rotation of the wheel 100, the locking element 9 moves toward the body frame 200 under camming action provided by ramps of the cam portions 9b and rotating force of the wheel 100. As a result, the locking element 9 is switched from the inoperative position POS. 1 to the operative position POS. 2 against the force of the disc spring 14.

Thus, the wheel 100 may be attached or detached with ease without manually maintaining the locking element 9 in the inoperative position POS. 1 not to obstruct the attaching or detaching operation, since the locking element 9 is maintained in the inoperative position POS. 1 by the disc spring 14. After the wheel 100 is attached, the user may just push or ride the bicycle. The resulting rotation of the wheel 100 relative to the body frame 200 automatically switches each locking element 9 to the operative position POS. 2 through the action of the cam portions 9b. The wheel retaining device now is in operation to secure the wheel 100 to the bicycle.

Figure 6:
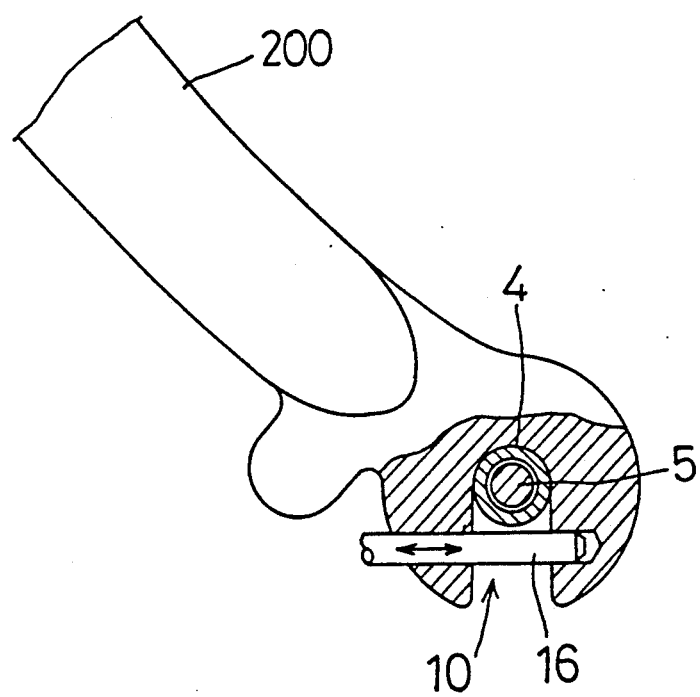
FIG. 6 is a side view of a modified wheel retaining device.

As shown in FIG. 6, a slide type locking element 16 may be employed in place of the locking element 9. This locking element 16 is attached to the body frame 200 to open and close an axle inlet portion of the wheel attaching cutout 10. When the locking element 16 is retracted to open the cutout 10, the hollow axle 4 may be moved into or out of the cutout 10 for attaching or detaching the wheel 100. When the locking element 16 is in a position to close the cutout 10, the hollow axle 4 is retained in the cutout 10 to secure the wheel 100 to the bicycle. Thus, the retaining device may be in the form of locking element 9 or slide type locking element 16. Further, the cam portions 9b may be replaced with cams for contacting the hub 1.

It is in accordance with the present invention to employ a control structure including a sensor for detecting rotation of the wheel, an actuator such as a spring mechanism or an electrically driven solenoid for operating the wheel retaining device, and a control unit for operating the actuator in response to information received from the sensor. In the claims, the spokes 15 are referred to as part of the wheel, and the cam portions 9b as control means operable with rotation of the wheel to switch the retaining means automatically.

What is claimed is:

1. A wheel mounting apparatus for attaching a wheel to wheel forks of a body frame of a bicycle, comprising:

axle means for rotatably supporting said wheel and connecting said wheel to said wheel forks, said axle means including a pair of end portions for holding said wheel between said wheel forks;

locking means for preventing detachment of said axle means from said wheel forks, said locking means being switchable between an operative position to prevent detachment of said axle means from said wheel forks, and an inoperative position to allow detachment of said axle means from said body frame; and control means responsive to rotation of said wheel relative to said wheel forks to automatically switch said locking means from said inoperative position to said operative position;

wherein said locking means includes a support element fixedly mounted on said axle means, a locking element displaceable relative to said support element, and a spring, said locking element being biased by said spring to one of said operative position and said inoperative position;

wherein said locking element is a ring slidable axially of said support element and unrotatable relative thereto, said ring including cams projecting from one end thereof for contacting part of said wheel, and a projection formed on the other end thereof for surrounding and engaging said frame.

2. A wheel mounting apparatus as claimed in claim 1, wherein said locking element and said support element are in splined engagement with each other.

3. A wheel mounting apparatus for attaching a wheel to wheel forks of a body frame of a bicycle, comprising:

axle means for rotatably supporting said wheel and connecting said wheel to said wheel forks, said axle means including a pair of end portions for holding said wheel between said wheel forks;

locking means for preventing detachment of said axle means from said wheel forks, said locking means being switchable between an operative position to prevent detachment of said axle means from said wheel forks, and an inoperative position to allow detachment of said axle means from said body frame; and control means responsive to rotation of said wheel relative to said wheel forks to automatically switch said locking means from said inoperative position to said operative position.

4. A wheel mounting apparatus as claimed in claim 3, wherein said locking means includes a support element fixedly mounted on said axle means, a locking element displaceable relative to said support element, and a spring, said locking element being biased by said spring to one of said operative position and said inoperative position.

5. A wheel mounting apparatus as claimed in claim 4, wherein said locking element includes an engaging portion and a cam portion, said cam portion being responsive to rotation of said wheel to move said engaging portion to a position to engage one of said body frames against a biasing force of said spring.

* * * * *